(12) United States Patent
Yang et al.

(10) Patent No.: US 7,885,631 B2
(45) Date of Patent: Feb. 8, 2011

(54) METHOD FOR RECEIVING SIGNAL IN COMMUNICATION SYSTEM AND SYSTEM THEREFOR

(75) Inventors: Ha-Young Yang, Yongin-si (KR); Ji-Ho Jang, Yongin-si (KR); Jae-Ho Jeon, Seongnam-si (KR); Sung-Kwon Jo, Seoul (KR); Seung-Joo Maeng, Seongnam-si (KR); Byung-Joon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 567 days.

(21) Appl. No.: 12/020,162

(22) Filed: Jan. 25, 2008

(65) Prior Publication Data

US 2008/0182543 A1 Jul. 31, 2008

(30) Foreign Application Priority Data

Jan. 26, 2007 (KR) ............ 10-2007-0008319
Feb. 7, 2007 (KR) ............ 10-2007-0012952

(51) Int. Cl.
*H04B 1/10* (2006.01)
*H04B 1/16* (2006.01)

(52) U.S. Cl. ............................. 455/312; 455/337
(58) Field of Classification Search ............. 455/63.1, 455/67.13, 226.1, 283, 296, 312, 334, 337; 370/343
See application file for complete search history.

(56) References Cited

U.S. PATENT DOCUMENTS

2006/0078075 A1 4/2006 Stamoulis et al.
2007/0270100 A1* 11/2007 Agrawal et al. .......... 455/67.11

FOREIGN PATENT DOCUMENTS

KR 1020060100960 9/2006

* cited by examiner

*Primary Examiner*—Nguyen Vo
(74) *Attorney, Agent, or Firm*—The Farrell Law Firm, LLP

(57) ABSTRACT

Disclosed is a method for receiving a signal by a receiver in a communication system, the method includes receiving a signal; estimating a first noise value by using a reference signal included in the received signal; estimating a second noise value by using at least one subcarrier which has been unused for a transmission of data and the reference signal; and when a difference between the estimated first noise value and the estimated second noise value is greater than a threshold value, demodulating the data by using an interference removal algorithm.

17 Claims, 12 Drawing Sheets

METHOD FOR RECEIVING SIGNAL IN COMMUNICATION SYSTEM AND SYSTEM THEREFOR

PRIORITY

This application claims priority under 35 U.S.C. §119(a) to a Korean Patent Application entitled "Method For Receiving Signal In Communication System And System Therefor" filed with the Korean Intellectual Property Office on Jan. 26, 2007 and assigned Serial No. 2007-8319, and filed Feb. 7, 2007 and assigned Serial No. 2007-12952, the contents of which are incorporated herein by reference.

BACKGROUND OF THE INVENTION

1. Field of the Invention

The present invention relates to a communication system, and more particularly to a method for receiving a signal in a communication system and a system therefor.

2. Description of the Related Art

In the next generation communication systems, research is actively being conducted to provide users with services having various Qualities of Service (QoS) at a high speed. A representative next-generation communication system is known as an Institute of Electrical and Electronics Engineers (IEEE) 802.16 communication system.

The IEEE 802.16 communication system is a communication system (hereinafter, an OFDM/OFDMA communication system) employing an Orthogonal Frequency Division Multiplexing (OFDM)/Orthogonal Frequency Division Multiple Access (OFDMA) scheme.

The OFDM/OFDMA communication system prevents signals from being distorted by using guard intervals in order to prevent signal interference between adjacent bands. The guard intervals may be also used to prevent signal interference between frequency bands allocated to providers. Also, when the OFDM/OFDMA communication system supports a Time Division Duplex (TDD) scheme, Transmit Transition Gaps (TTGs) and Receive Transition Gaps (RTGS) exist between uplink subframes and downlink subframes. The TTGs and RTGs are gaps required for switching between uplinks and downlinks. Since the guard interval between frequency bands occupies only one band, but is not used for signal transmission, the efficiency of resources is degraded as more resources are used for the guard interval.

Meanwhile, in a communication system, it is important to remove signal interference through channel estimation in order to enhance the performance of the system. The channel estimation is achieved using a reference signal, e.g., a preamble or a pilot signal. In the channel estimation, as the amount of reference signals increases, the channel estimation can be more accurate. However, as the amount of reference signals increases, the amount of resources to be used for data transmission decreases. This acts as an overhead in the communication system. Therefore, it is necessary to develop a method of accurately estimating a channel using a limited reference signal.

SUMMARY OF THE INVENTION

Accordingly, the present invention has been made to solve the above-mentioned problems occurring in the prior art, and the present invention provides a method and system for receiving a signal with an improved channel estimation performance in a communication system.

Also, the present invention provides a method and system for receiving a signal through channel estimation considering thermal noise measured in frequency-domain guard intervals, wherein there exists no transmitted signal, in a communication system.

In addition, the present invention provides a method and system for receiving a signal through channel estimation considering thermal noise measured in gaps for switching between uplink and downlink, wherein there exists no transmitted signal, in a communication system supporting a Time Division Duplex (TDD) scheme.

In accordance with an aspect of the present invention, there is provided a method for receiving a signal by a receiver in a communication system, the method including receiving the signal; estimating a first noise value by using a reference signal included in the received signal; estimating a second noise value by using at least one subcarrier which has been unused for a transmission of data and the reference signal; and when a difference between the estimated first noise value and the estimated second noise value is greater than a threshold value, demodulating data by using an interference removal algorithm.

In accordance with another aspect of the present invention, there is provided a method for receiving a signal by a receiver in a communication system, the method including receiving a signal; estimating a first noise value by using a reference signal according to each tile included in the received signal; estimating a second noise value by using at least one subcarrier which has been unused for a transmission of data and the reference signal; and when a difference between the estimated first noise value and the estimated second noise value is greater than a threshold value, decoding the data by using a Log-Likelihood Ratio (LLR).

In accordance with still another aspect of the present invention, there is provided a communication system including a base station for transmitting a signal; and a subscriber station for, when receiving the signal transmitted from the base station, estimating a first noise value by using a reference signal included in the signal, estimating a second noise value by using at least one subcarrier which has been unused for a transmission of data and the reference signal, and when a difference between the estimated first noise value and the estimated second noise value is greater than a threshold value, demodulating the data by using an interference removal algorithm.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, one exemplary embodiment of the present invention will be described with reference to the accompanying drawings. In the following description, a detailed description of known functions and configurations incorporated herein will be omitted when it may obscure the subject matter of the present invention.

The present invention provides a method and system for receiving a signal with an improved channel estimation performance in a communication system. The present invention can be applied to all communication systems which form either frequency-domain guard intervals or Transmit Transition Gaps (TTGs) and Receive Transition Gaps (RTGs) using a plurality of subcarriers.

According to the method for improving a channel estimation performance based on the present invention, a receiver estimates noise power by using a pilot signal, estimates thermal noise power by using subcarriers, which have been not used for the transmission of the pilot signal and data, and demodulates data by performing an interference removal algorithm or a maximal ratio combining algorithm according to whether a difference between the noise power and the thermal noise power is greater than a threshold value.

When the interference removal algorithm or maximal ratio combining algorithm has been predetermined in the communication system, the receiver applies either a Log-Likelihood Ratio (LLR) or an LLR, in which an average of noise power according to each tile is reflected, according to whether a difference between noise power and thermal noise power for each tile is greater than a threshold value, and decodes data.

The subcarriers that have been not used for the transmission of the pilot signal and data include subcarriers constituting guard intervals and a part of subcarriers constituting the TTGs and RTGs. Here, the guard intervals may be guard intervals for preventing signal interference between frequency bands allocated to providers.

Figure 1:
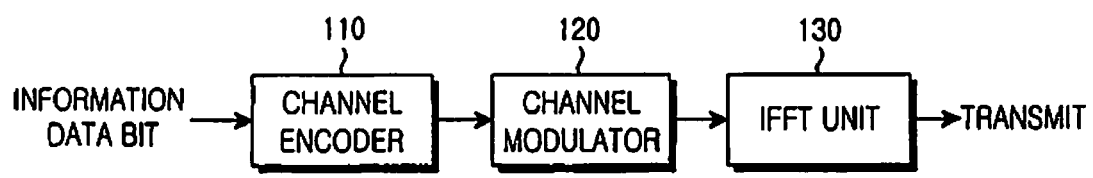
FIG. 1 is a block diagram schematically illustrating the configuration of a transmitter in a communication system according to an exemplary embodiment of the present invention.

FIG. 1 is a block diagram schematically illustrating the configuration of a transmitter in a communication system according to an exemplary embodiment of the present invention.

The transmitter includes a channel encoder 110, a channel modulator 120, and an Inverse Fast Fourier transform (IFFT) unit 130.

When receiving an information data bit to be transmitted to a receiver, the channel encoder 110 generates a codeword from the information data bit through a preset encoding scheme, and outputs the generated codeword to the channel modulator 120. The channel modulator 120 generates a modulation symbol by modulating the codeword through a preset modulation scheme, and outputs the generated modulation symbol to the IFFT unit 130. The IFFT unit 130 performs an IFFT operation on the frequency-domain modulation symbol, thereby converting the frequency-domain modulation symbol into a time-domain symbol.

Figure 2:
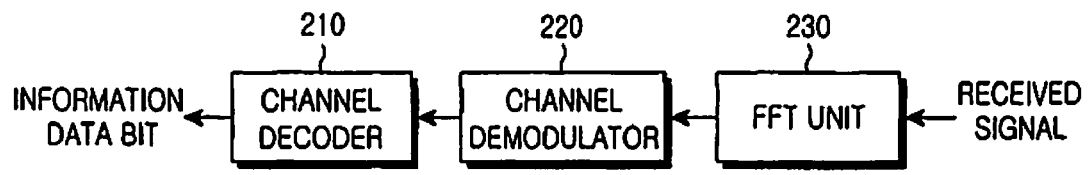
FIG. 2 is a block diagram schematically illustrating the configuration of a receiver in a communication system according to an exemplary embodiment of the present invention.

FIG. 2 is a block diagram schematically illustrating the configuration of a receiver in a communication system according to an exemplary embodiment of the present invention.

The receiver includes a Fast Fourier Transform (FFT) unit 230, a channel demodulator 220, and a channel decoder 210.

When receiving a signal, the FFT unit 230 performs an FFT operation on the received signal, and outputs the resultant signal to the channel demodulator 220. The channel demodulator 220 demodulates the signal received from the FFT unit 230 through a preset demodulation scheme, and outputs the demodulated signal to the channel decoder 210. Here, the demodulation scheme used by the channel demodulator 220 corresponds to a modulation scheme used by a channel modulator in a transmitter corresponding to the receiver. When receiving the signal output from the channel demodulator 220, the channel decoder 210 restores information data transmitted from the corresponding transmitter by decoding the received signal through a preset decoding scheme.

Figure 3:
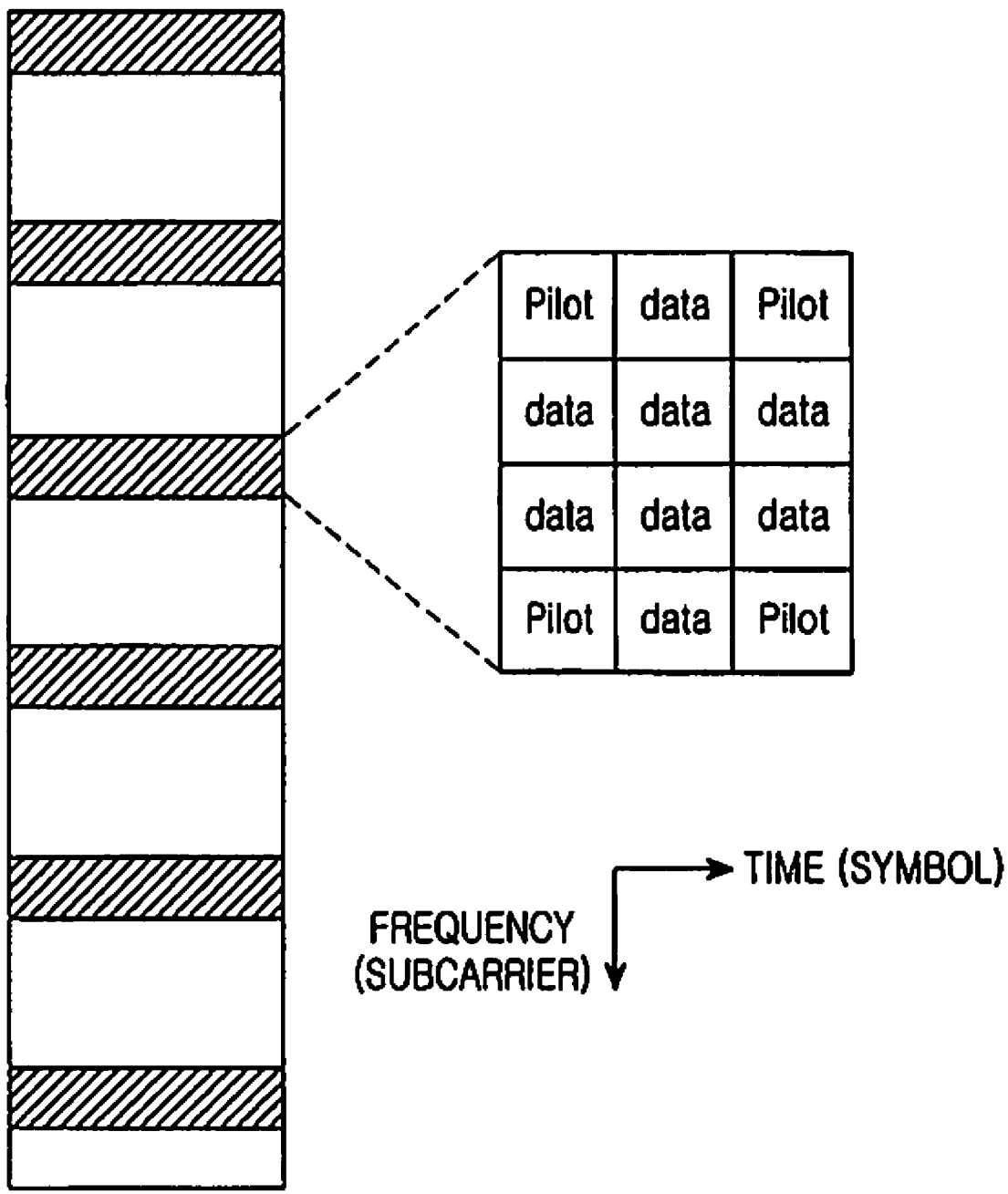
FIG. 3 is a view illustrating an example of a tile structure in a communication system according to an exemplary embodiment of the present invention.

FIG. 3 is a view illustrating an example of a tile structure in a communication system according to an exemplary embodiment of the present invention.

Each tile consists of a 4×3 array of tones, wherein, among the twelve tones, eight tones are used for the transmission of data, and the remaining four tones are used for the transmission of pilot signals.

A receiver estimates a frequency offset and a timing offset by using the pilot signals, compensates for the estimated frequency offset and timing offset, and performs a channel estimation. Then, the receiver compensates phase and magnitude in consideration of a result of the channel estimation. The result of the channel estimation may be expressed, for example, as a Signal-to-Noise Ratio (SNR).

Figure 4:
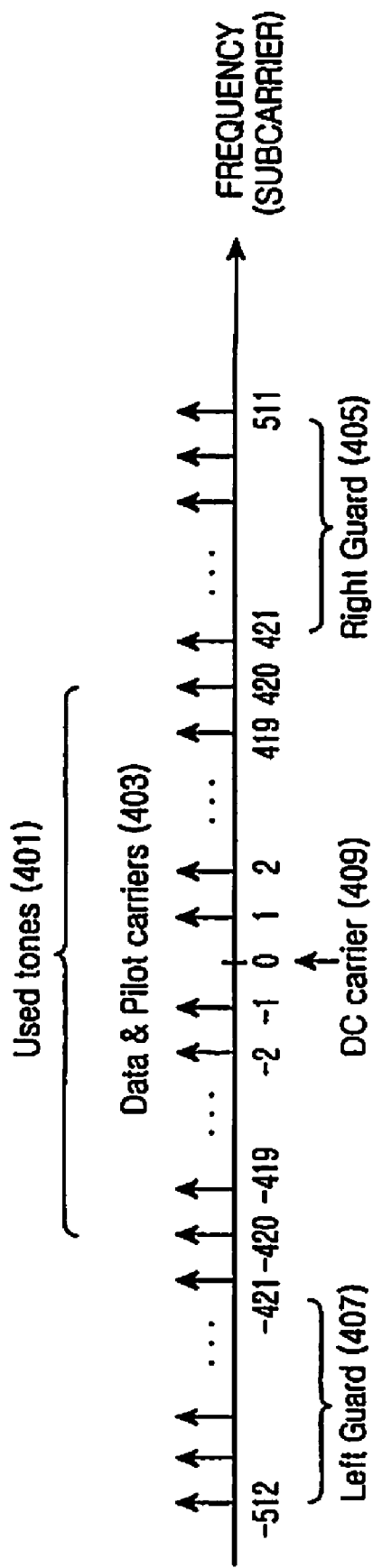
FIG. 4 is a view illustrating an example of subcarrier allocation in a communication system according to an exemplary embodiment of the present invention.

FIG. 4 is a view illustrating an example of subcarrier allocation in a communication system according to an exemplary embodiment of the present invention. That is, FIG. 4 illustrates used subcarriers and unused subcarriers among 1024 subcarriers in the communication system.

The entire frequency band is divided into used subcarriers 401 and unused subcarriers 405 and 407, wherein the used subcarriers 401 include a DC subcarrier 409 and subcarriers 403 used for the transmission of pilots and data. The unused subcarriers 405 and 407 include subcarriers for guard intervals.

The receiver can estimate a channel state by using the subcarriers 405 and 407 used for the guard intervals. Here, when it is assumed that an interference signal due to a second frequency band, which differs from a first frequency band constituted by the 1024 subcarriers, is not received through the first frequency band, and that interference exists between the subcarriers within the first frequency band, a received signal may be expressed as Equation 1 below.

$$Y_k = (X_k H_k)\{\sin(\pi\varepsilon)/N\sin(\pi\varepsilon/N)\}e^{j\pi\varepsilon(N-1)/N} + \sum_{l=0,l\neq k}^{N-1}(X_l H_l)\{\sin(\pi\varepsilon)/N\sin(\pi(l-k+\varepsilon)/N)\}e^{j\pi\varepsilon(N-1)/N}e^{-j\pi(l-k)/N} + W_k \quad (1)$$

In Equation 1, "$Y_k$" represents a received signal of a $k^{th}$ subcarrier, "$X_k$" represents a transmission signal of a $k^{th}$ subcarrier, "$H_k$" represents a channel response of a $k^{th}$ subcarrier, "$W_k$" represents Gaussian noise, "N" represents the size of an FFT, and "$\varepsilon$" represents a frequency offset. Due to a received signal of a subcarrier adjacent to a certain subcarrier, included in a received signal of the certain subcarrier, the amount of interference is determined according to gaps (i.e. subcarrier spacing) between subcarriers.

Figure 5:
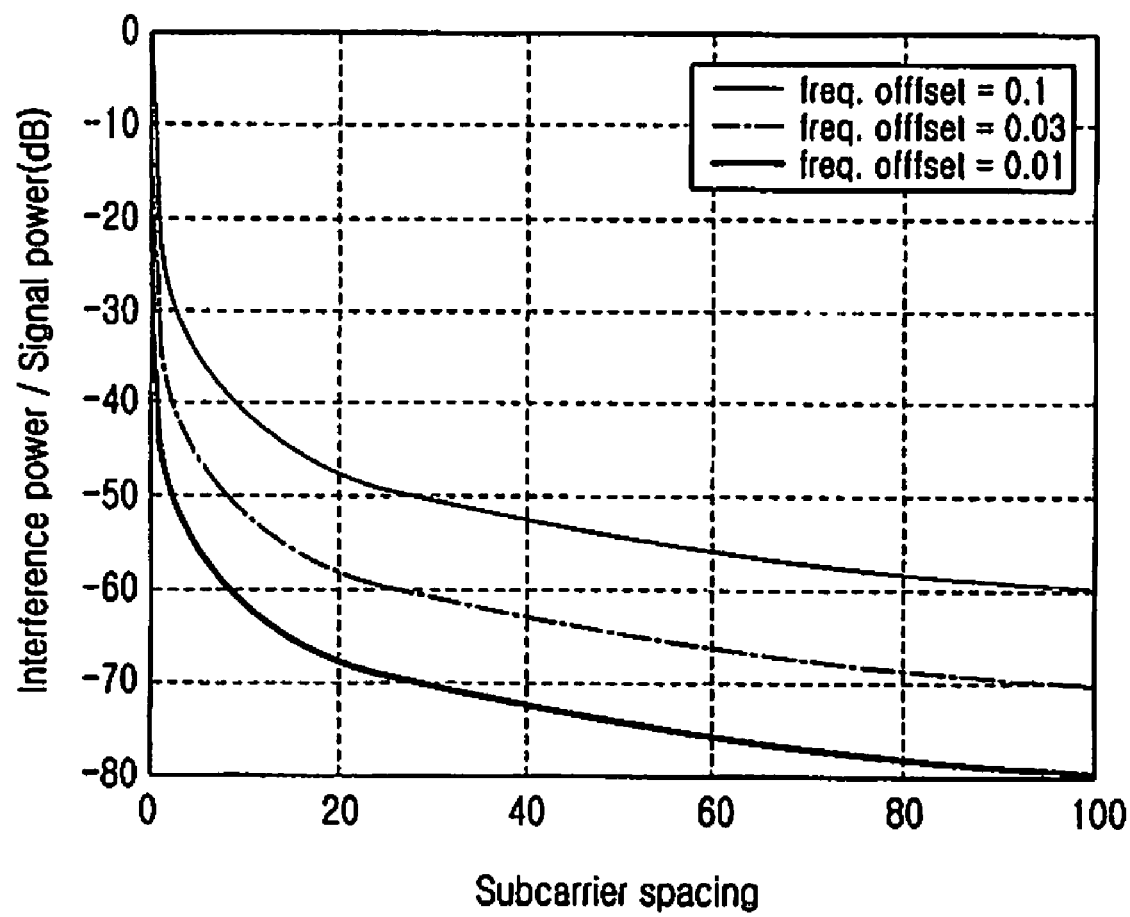
FIG. 5 is a graph illustrating interference as a function of subcarrier spacing in a communication system according to an exemplary embodiment of the present invention.

FIG. 5 is a graph illustrating degrees of interference as a function of subcarrier spacing in a communication system according to an exemplary embodiment of the present invention.

Referring to FIG. 5, in all cases where the frequency offset is 0.1, 0.03 or 0.01, the amount of interference (i.e., an interference power/signal power [dB]) is inversely proportional to the subcarrier distance. That is, a received signal of a certain subcarrier exerts a smaller effect on a received signal of a subcarrier further away from the certain subcarrier, than an effect on a received signal of a subcarrier closer to the certain subcarrier.

Figure 6:
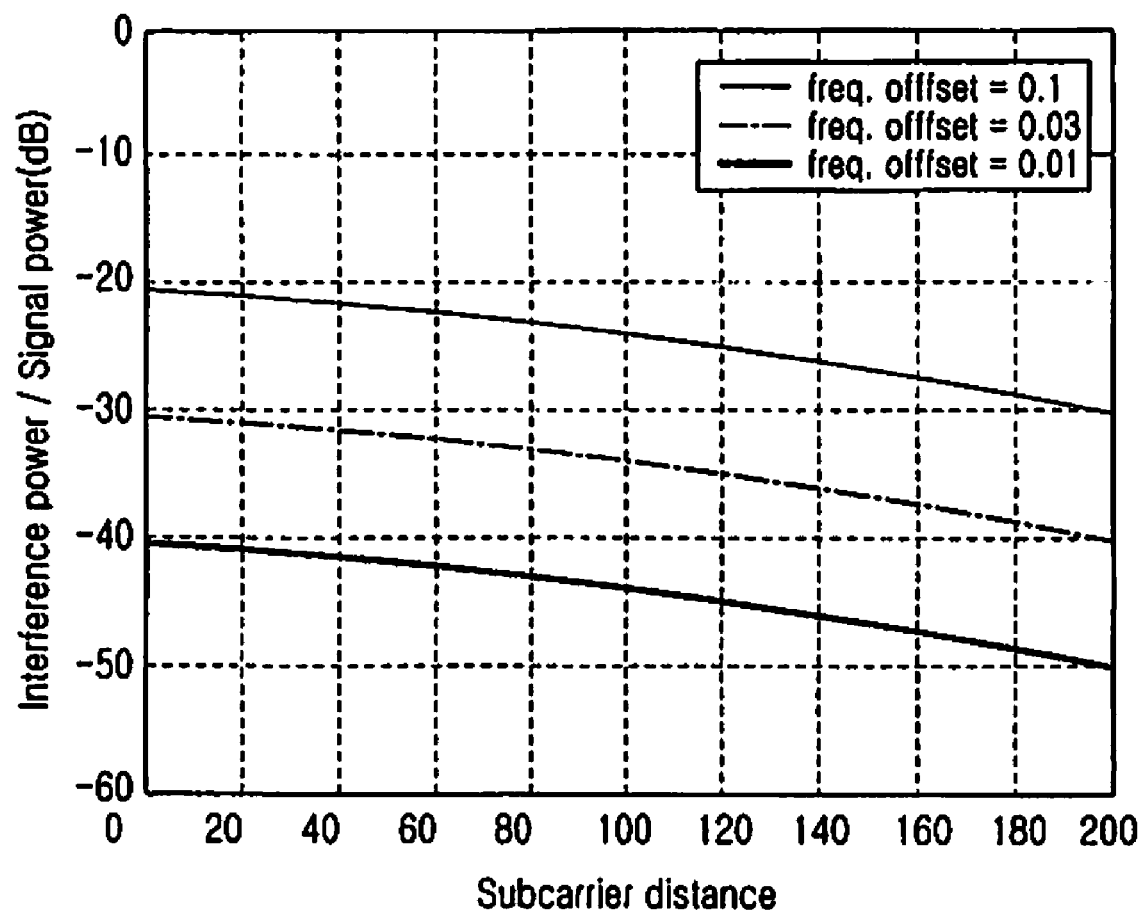
FIG. 6 is a graph illustrating the sum of all interference as a function of subcarrier spacing in a communication system according to an exemplary embodiment of the present invention.

FIG. 6 is a graph illustrating the sum of all interferences as a function of subcarrier spacing in a communication system according to an exemplary embodiment of the present invention.

In the case where the frequency offsets are 0.1, 0.03 and 0.01 times as great as the subcarrier spacing, when a subcarrier to be measured is spaced more than several times as the size of the subcarrier spacing, from subcarriers allocated with a transmission channel, interferences generated due to the frequency offsets in the subcarrier to be measured are less than −20 dB. Here, since the frequency offsets are less than or equal to 0.1 times as the size of the subcarrier spacing, interference caused by the frequency offsets is small.

For example, when a communication system uses a system bandwidth of 10 MHz in a frequency band of 2.5 GHz, a subcarrier spacing by 1024 FFT becomes approximately 10 kHz, and a frequency offset becomes approximately 1 kHz. That is, a frequency offset between a transmitter and a receiver is approximately 1 kHz, and, for example, when a moving speed of a subscriber station is taken into consideration, the frequency offset becomes less than 0.1. Therefore, an interference applied to subcarriers for guard intervals due to the negligible level of the frequency. Accordingly, the receiver can estimate a channel state by using the subcarriers used for the guard intervals.

The receiver may use all of or a part of the subcarriers for the guard intervals in order to estimate a channel state. In this case, the channel state of the guard intervals may be expressed as thermal noise power. Meanwhile, in the description of the present invention, it is assumed that a spectral leakage phenomenon between frequency bands, i.e., an interference phenomenon between frequency bands, is not caused.

Figure 7:
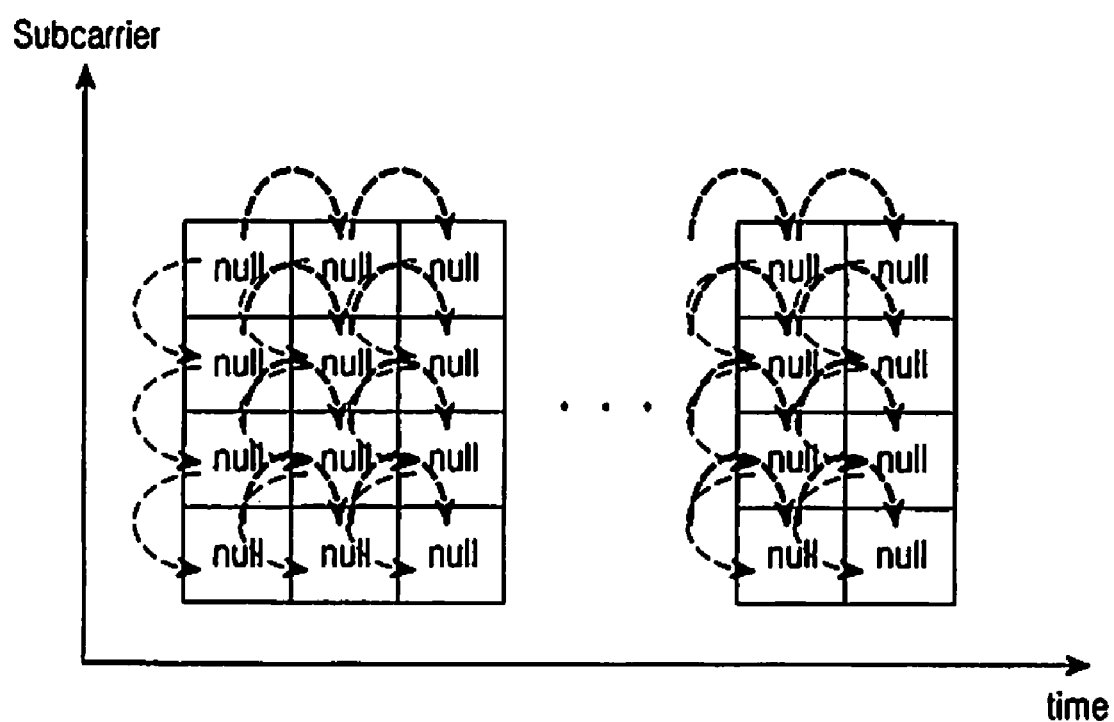
FIG. 7 is a view explaining an estimation of thermal noise power within the guard intervals in a communication system according to an exemplary embodiment of the present invention.

FIG. 7 is a view illustrating guard intervals in order to explain an estimation of thermal noise power within the guard intervals in a communication system according to an exemplary embodiment of the present invention.

A receiver may estimate thermal noise using the square of a difference between values of adjacent tones along the time axis, or using the square of a difference between values of adjacent tones along the frequency axis. Also, the receiver may estimate thermal noise using both of the schemes. Here, each tone corresponds to the smallest unit quadrangle (i.e., a part denoted as "null") in FIG. 7. An estimated thermal noise may be expressed as Equation 2 below.

$$N_0 = \frac{1}{2N_{total}} \sum_{(k,l)}^{N_{total}-1} (|r_k - r_l|^2) \quad (2)$$

In Equation 2, "$N_0$" represents an estimated thermal noise power, and "$N_{total}$" represents the total number of pairs of tones which exist in guard intervals. For example, when the total number of tones is 4×3 in FIG. 7, the number of pairs, which are expressed by arrows, is 17. Also, in Equation 2, "$r_k$" represents a received signal of a $k^{th}$ tone, "$r_1$" represents a received signal of an $l^{th}$ tone, and "(k, l)" represents a pair of adjacent tones. In this case, when the number of subcarriers is "M," and the number of symbols is "N," the number of pairs used for thermal noise estimation becomes "2MN−M−N" from "(M−1)×N+(N−1)×M."

Figure 8:
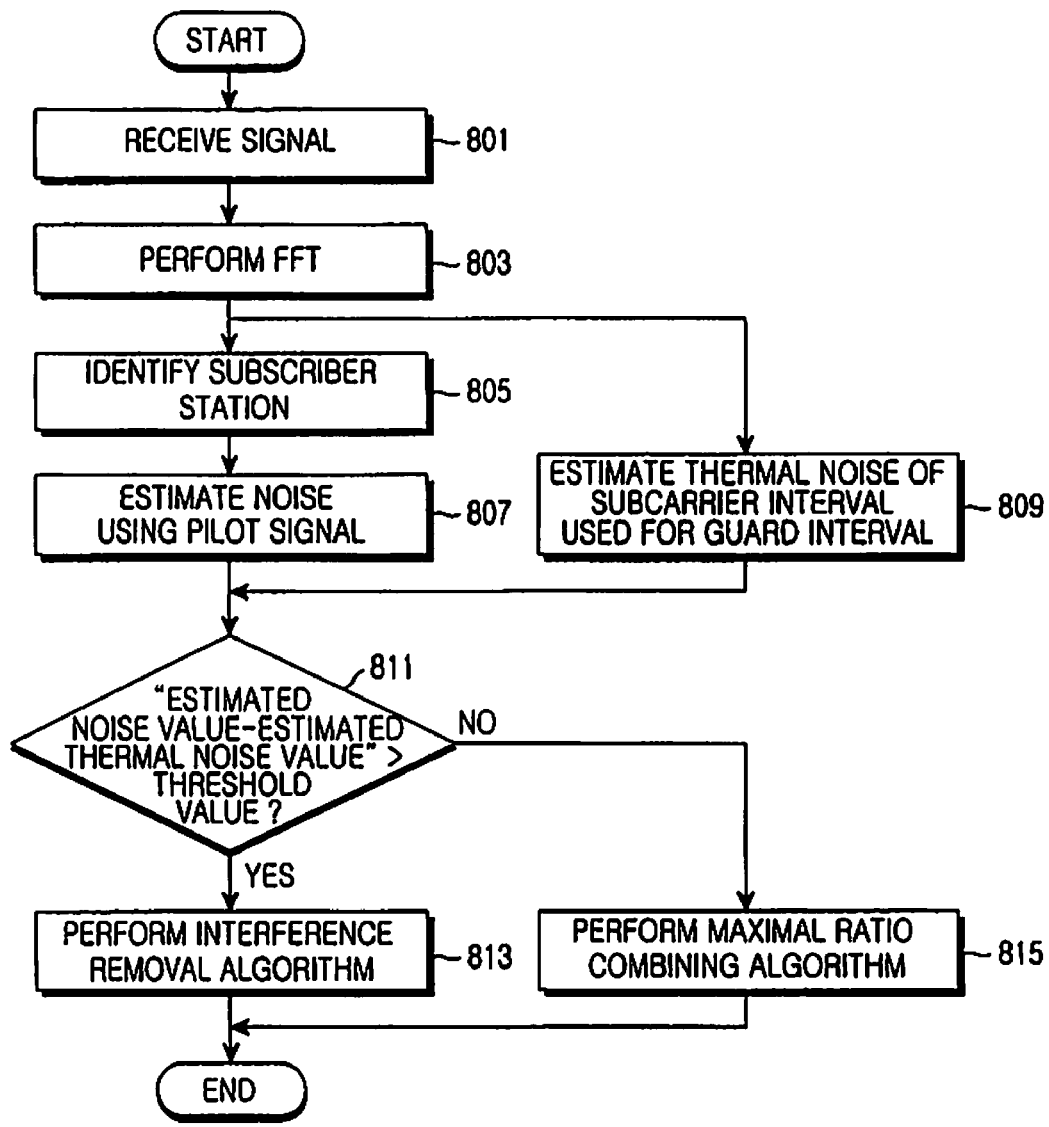
FIG. 8 is a flowchart showing an example of the operation of a receiver in a communication system according to an exemplary embodiment of the present invention.

FIG. 8 is a flowchart showing an example of the operation of a receiver in a communication system according to an exemplary embodiment of the present invention.

In step 801, the receiver receives a signal. In step 803, the receiver performs an FFT operation on the received signal so as to convert the received signal into a frequency-domain signal, and proceeds to steps 805 and 809. In step 805, the receiver identifies a subscriber station from the received signal, which has been converted into the frequency-domain signal, and proceeds to step 807. In step 807, the receiver estimates noise by using a pilot signal, and proceeds to step 811.

Meanwhile, in step 809, the receiver estimates thermal noise by using an unused subcarrier interval, for example, using all of or a part of guard intervals, and proceeds to step 811.

In step 811, the receiver determines whether a difference between the noise value estimated in step 807 and the thermal noise value estimated in step 809 is greater than a threshold value. When it is determined that the difference between the estimated noise value and the estimated thermal noise value is greater than the threshold value, the receiver proceeds to step 813. In step 813, the receiver performs an interference removal algorithm, thereby demodulating data.

In contrast, when it is determined in step 811 that the difference between the estimated noise value and the estimated thermal noise value is less than or equal to the threshold value, the receiver proceeds to step 815. In step 815, the receiver performs a maximal ratio combining algorithm, thereby demodulating data.

A procedure of decoding a signal by using noise power estimated according to each tile in a state where an interference removal algorithm or maximal ratio combining algorithm has been preset will now be described with reference to FIG. 9.

Figure 9:
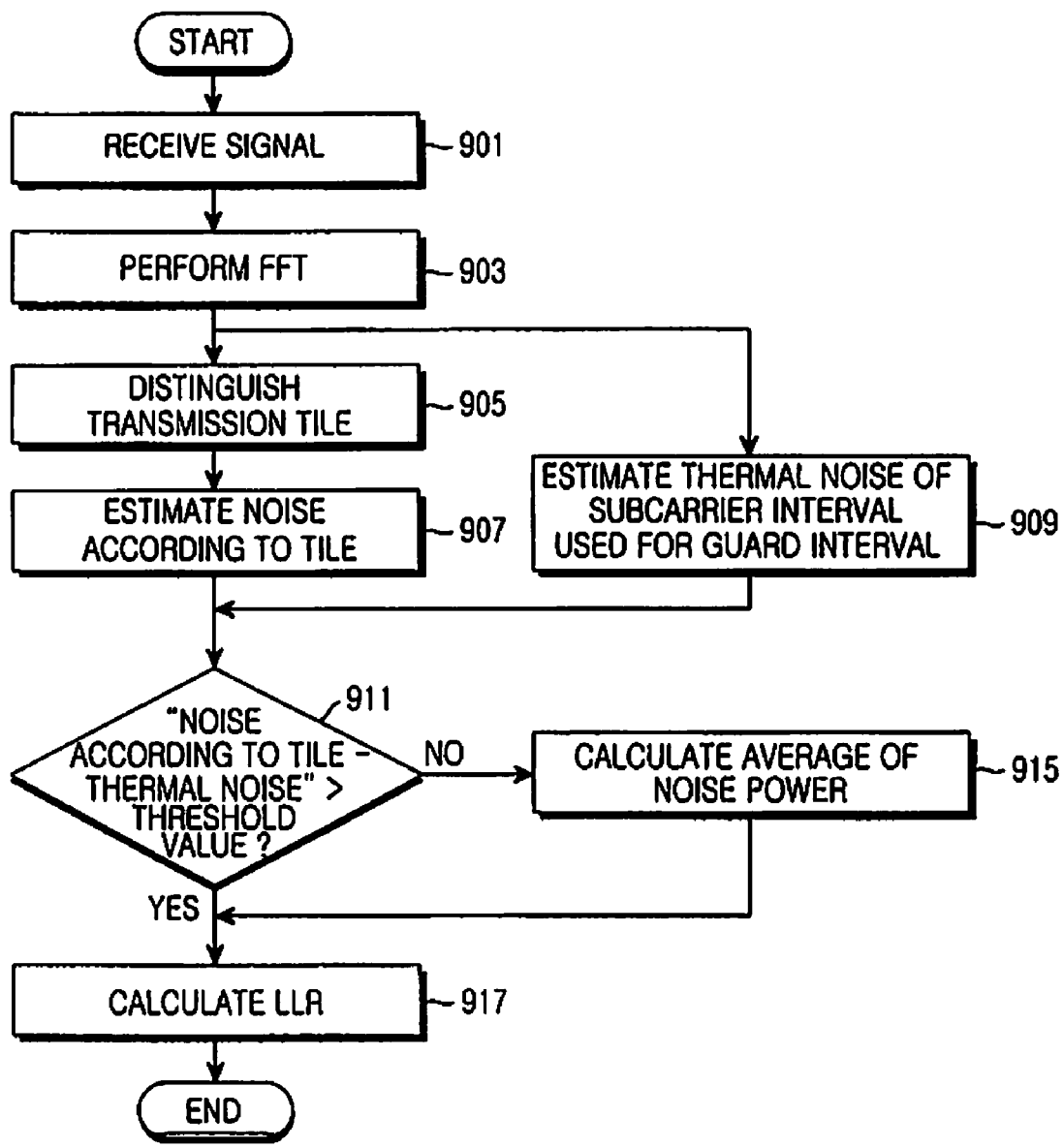
FIG. 9 is a flowchart showing another example of the operation of a receiver in a communication system according to an exemplary embodiment of the present invention.

FIG. 9 is a flowchart showing another example of the operation of a receiver in a communication system according to an exemplary embodiment of the present invention.

In step 901, the receiver receives a signal, and proceeds to step 903. In step 903, the receiver performs an FFT operation on the received signal so as to convert the received signal into a frequency-domain signal, and proceeds to steps 905 and 909. In step 905, the receiver distinguishes the respective tiles in the received signal, which has been converted into the frequency-domain signal, and proceeds to step 907.

In step 907, the receiver estimates noise according to each transmission tile, and proceeds to step 911. Meanwhile, in step 909, the receiver estimates thermal noise by using an unused subcarrier interval, for example, using all of or a part of guard intervals, and proceeds to step 911.

In step 911, the receiver determines whether a difference between the noise value estimated according to each transmission tile in step 907 and the thermal noise value estimated in step 909 is greater than a threshold value. When it is determined that the difference between the noise value estimated according to each transmission tile and the estimated thermal noise value is greater than the threshold value, as a result of the determination, the receiver proceeds to step 917.

In contrast, when it is determined in step 911 that the difference between the noise value estimated according to each transmission tile and the estimated thermal noise value is less than or equal to the threshold value, the receiver proceeds to step 915. In step 915, the receiver calculates an average of noise power in the received signal, and proceeds to step 917.

In step 917, the receiver calculates an LLR to be used upon data decoding, and decodes data by using the calculated LLR. The LLR may be calculated by Equation 3 below.

$$LLR_b = \ln\frac{p(Y|b=1)}{p(Y|b=0)} \quad (3)$$
$$= \ln\frac{\sum_{b=1} p(X|Y)}{\sum_{b=0} p(Y|X)}$$
$$= \ln\frac{\sum_{b=1} \exp\left[-p_s \frac{(Y-X)^2}{2\sigma^2}\right]}{\sum_{b=0} \exp\left[-p_s \frac{(Y-X)^2}{2\sigma^2}\right]}$$
$$= \ln\frac{\sum_{b=1} \exp[-SNR(Y-X)^2]}{\sum_{b=0} \exp[-SNR(Y-X)^2]}$$

In Equation 3, "Y" represents a value obtained by normalizing a receive signal to an SNR, "X" represents a value of constellation upon signal modulation, "b" represents a bit value of transmission data, "$P_s$" represents power of a transmission symbol, and "$\sigma^2$" represents noise power.

Figure 10:
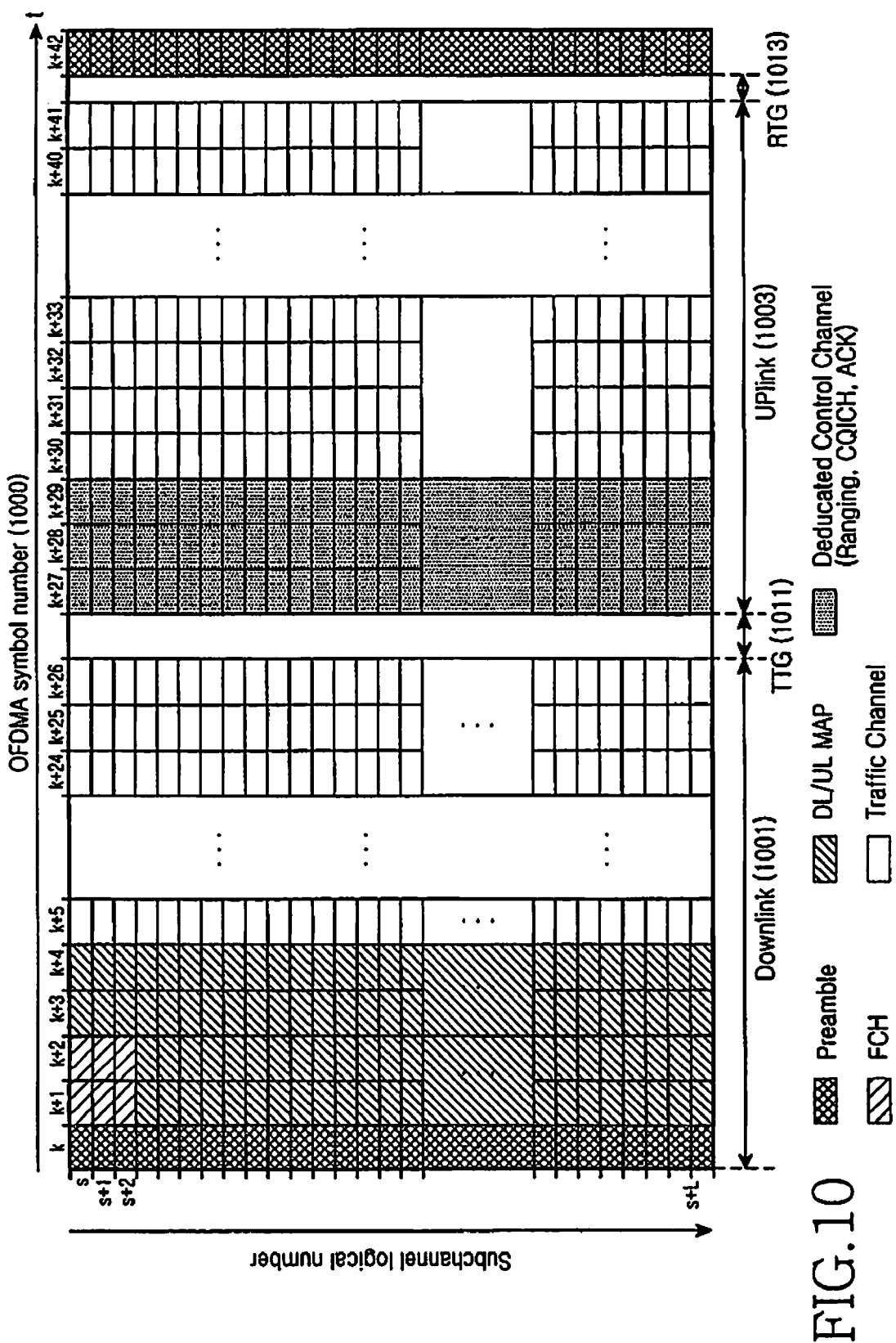
FIG. 10 is a view illustrating a frame structure including a downlink subframe and an uplink subframe in a communication employing a Time Division Duplex (TDD) scheme.

FIG. 10 is a view illustrating a frame structure in a communication employing a TDD scheme, wherein the frame structure includes a downlink subframe and an uplink subframe.

A transmission frame 1000 includes a downlink subframe 1001 and an uplink subframe 1003, wherein each subframe includes a plurality of symbols to transmit data. The downlink subframe 1001 is allocated a preamble for frame synchronization, and control information, such as a DownLink (DL)/UpLink (UL) Mobile Application Part (MAP), etc., and the traffic channel of the downlink subframe 1001 is allocated downlink data bursts. The uplink subframe 1003 is allocated control information for access to a dedicated control channel, and the traffic channel of the uplink subframe 1003 is allocated uplink data bursts. In addition, the transmission frame 1000 includes a TTG 1011 and an RTG 1013.

The TTG 1011 is defined as an interval between the downlink symbols and the uplink symbols, and corresponds to a time interval required for a base station to switch the operation mode thereof from a transmission mode to a reception mode. Additionally explaining the symbols, one symbol is expressed as a plurality of sample values within the limit of not losing information.

For example, in a Broadband Wireless Access (BWA) system, a signal is carried by a subcarrier, is subjected to an IFFT, and then is transmitted/received as a time-axis sample signal, wherein, in the case of a bandwidth of 10 MHz, 1024 FFT is used, so that the number of samples per symbol becomes 1024. That is, one symbol is constituted by 1024 samples.

During the TTG 1011, the base station lowers the power of the transmitter thereof, and switches a Transmission (Tx)/Reception (Rx) antenna so that the receiver thereof is operated, instead of transmitting data.

Meanwhile, the RTG 1013 is defined as an interval between the last uplink symbol and the first downlink symbol, and corresponds to a time interval required for the base station to switch the operation mode thereof from the reception mode to the transmission mode. During the RTG 1013, the base station performs an operation opposite to that the operation performed by the base station during the TTG 1011.

The TTG 1011 and the RTG 1013 are determined by a Round Trip Delay (RTD) according to a distance between the base station and a subscriber station, and by a transmission/reception switching gap of the subscriber station. The transmission/reception switching gap of the subscriber station includes a Subscriber Station Receive-Transmit Turnaround Gap (SSRTG) which is a time interval required for the subscriber station to switch the operation mode thereof from a reception mode to a transmission mode, and a Subscriber Station Transmit-Receive Turnaround Gap (SSTTG) which is a time interval required for the subscriber station to switch the operation mode thereof from the transmission mode to the reception mode.

In order to apply the TDD scheme, the base station must transmit downlink information to be transmitted to a subscriber station before an uplink channel first-scheduled in an uplink subframe starts to be allocated. That is, the downlink information must be transmitted before the "SSRTG+RTD" interval starts. This is necessary to prevent occurrence of such a situation where the subscriber station does not have enough time to switch the operation mode thereof to a transmission mode after receiving all reception signals. Therefore, the TTG 1011 is determined to be a value longer than the "SSRTG+RTD." In addition, in order to apply the TDD scheme, the base station must not transmit downlink information to be transmitted to the subscriber station before an uplink channel last-scheduled in an uplink subframe has been allocated. That is, the downlink information must not be transmitted before the "SSTTG+RTD" interval starts. This is necessary to prevent occurrence of such a situation where, when the base station transmits a downlink signal before the "SSTTG+RTD" interval starts, the downlink signal is input to the subscriber station before the operation mode thereof is switched from the transmission mode to the reception mode, so that the subscriber station cannot receive the downlink signal. Therefore, the RTG 1013 must be determined to be a value longer than the "SSTTG+RTD."

For example, the minimum requirement adopted by the IEEE 802.16d/e standard for a BWA communication system requires that both SSTTG and SSRTG must be equal to or less than 50 μs.

Table 1 shows profiles determined in the IEEE 802.16d/e standards with respect to a TTG/RTG required for switching between a downlink and an uplink within one frame, based on a plurality of bandwidths. Table 1 shows a case where one frame has a length of 5 ms, wherein a time period allocated to the TTG 1011 and RTG 1013 occupies approximately 3 to 4% of the entire symbol interval.

TABLE 1

| Bandwidth | FFT | Sampling Frequency | CP Duration | Symbol Duration | Number of Symbols | TTG | RTG | Cell Radius Limit |
|---|---|---|---|---|---|---|---|---|
| 10 MHz | 1024 | 11.2 MHz | 11.4 usec 128 samples | 102.9 usec 1152 samples | 47 | 105.7 usec | 60 usec | 8.4 km |
| 8.75 MHz | 1024 | 10 MHz | 12.8 usec 128 samples | 115.2 usec 1152 samples | 42 | 87.2 usec | 74.4 usec | 5.6 km |
| 7 MHz | 1024 | 8 MHz | 16 usec 128 samples | 144 usec 1152 samples | 33 | 188 usec | 60 usec | 20.7 km |

As described above, in Table 1, the TTG 1011 is determined by the "SSRTG+RTD," wherein the RTD is determined by a cell radius limit to be covered. In other words, in order to apply the TDD scheme to all subscriber stations, which are being provided with service within a cell, it is necessary to apply an RTD corresponding to the longest of distances between the base station and the respective subscriber stations. Table 1 shows the values of cell radiuses calculated when the SSRTG of 50 μs, which is the minimum requirement for subscriber stations, is applied. Referring to Table 1, the maximum service radius of a wireless communication system with a bandwidth of 8.75 MHz is 5.6 km, wireless communication systems with the other bandwidths cover greater service radiuses. Therefore, a relatively greater RTD time is allocated, as compared with an RTD time allocated to a general cell area to which a communication system is to provide service.

Since the TTG 1011 and RTG 1013 are allocated to have a time period long enough to switch between the downlink subframe 1001 and the uplink subframe 1003 in the transmission frame 1000, as described above, it is possible to improve the demodulation performance by using samples causing a very little interference within the TTG or RTG That is, a specific signal carrying wireless channel information can be transmitted during a transition interval having a small influence by interference from its neighbors. In addition, it is possible to obtain channel information by measuring samples themselves, without transmitting any additional signal.

Figure 11:
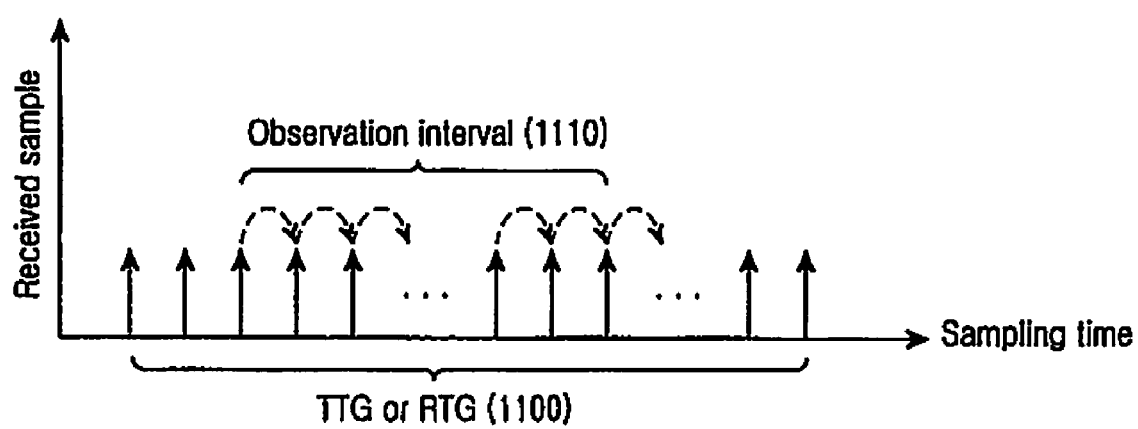
FIG. 11 is a view showing a thermal noise estimation method using a TTG or RTG according to an exemplary embodiment of the present invention.

FIG. 11 is a view showing an example of a thermal noise estimation using a TTG or RTG according to an exemplary embodiment of the present invention.

A receiver estimates thermal noise within an observation interval 1110 from samples 1100 in the TTG or RTG. That is, the receiver estimates thermal noise power by using samples existing in the observation interval 1110 from among the samples 1100 in the TTG or RTG.

For example, when it is assumed that a TTG is employed in a wireless communication system using a bandwidth of 8.75 MHz, the SSRTG of a subscriber station is 50 μs, and the cell radius is 2 km, a sample interval unused for signal transmission and Tx/Rx switching becomes 239 samples, from "sample time=87.2−50−13.3=23.9 μs," because the TTG is 87.2 μs in Table 1. Herein the 13.3 denotes a round trip delay of the cell radius 2 km. In FIG. 11, the number of samples corresponding to reference numeral "1100" is 1057, and the number of samples corresponding to reference numeral "1110" is 424. A method of estimating thermal noise power by taking the square of a difference between adjacent samples within the observation interval 1110 will be implemented by according to Equation 2.

In FIG. 11, when the number of samples is "N," the number "$N_{total}$" of pairs of received samples used for a thermal noise estimation becomes "N−1."

After estimating thermal noise power by Equation 2, the receiver compares the estimated thermal noise power value with a noise power value estimated using a pilot signal, and selects a demodulation algorithm to be used upon demodulating received data according to a result of the comparison. Then, the receiver demodulates data using the selected demodulation algorithm. In this case, when the estimated thermal noise power value is less than the estimated noise power value, it can be inferred that the received signal includes many interference components, as well as thermal noise. In contrast, when the estimated thermal noise power value is equal to or greater than the estimated noise power value, it can be inferred that the received signal includes a few interference components.

Meanwhile, the receiver additionally takes a threshold value into consideration when comparing the estimated thermal noise power value with the estimated noise power value. That is, the receiver may determine whether a sum of the estimated thermal noise power value and the threshold value is less than the estimated noise power value, or is equal to or greater than the estimated noise power value.

Therefore, as described above, the receiver demodulates data by using either the interference removal algorithm or the maximal ratio combining algorithm, which has the optimum performance with respect to Gaussian noise, based on information about the amount of interference included in the received signal.

Figure 12:
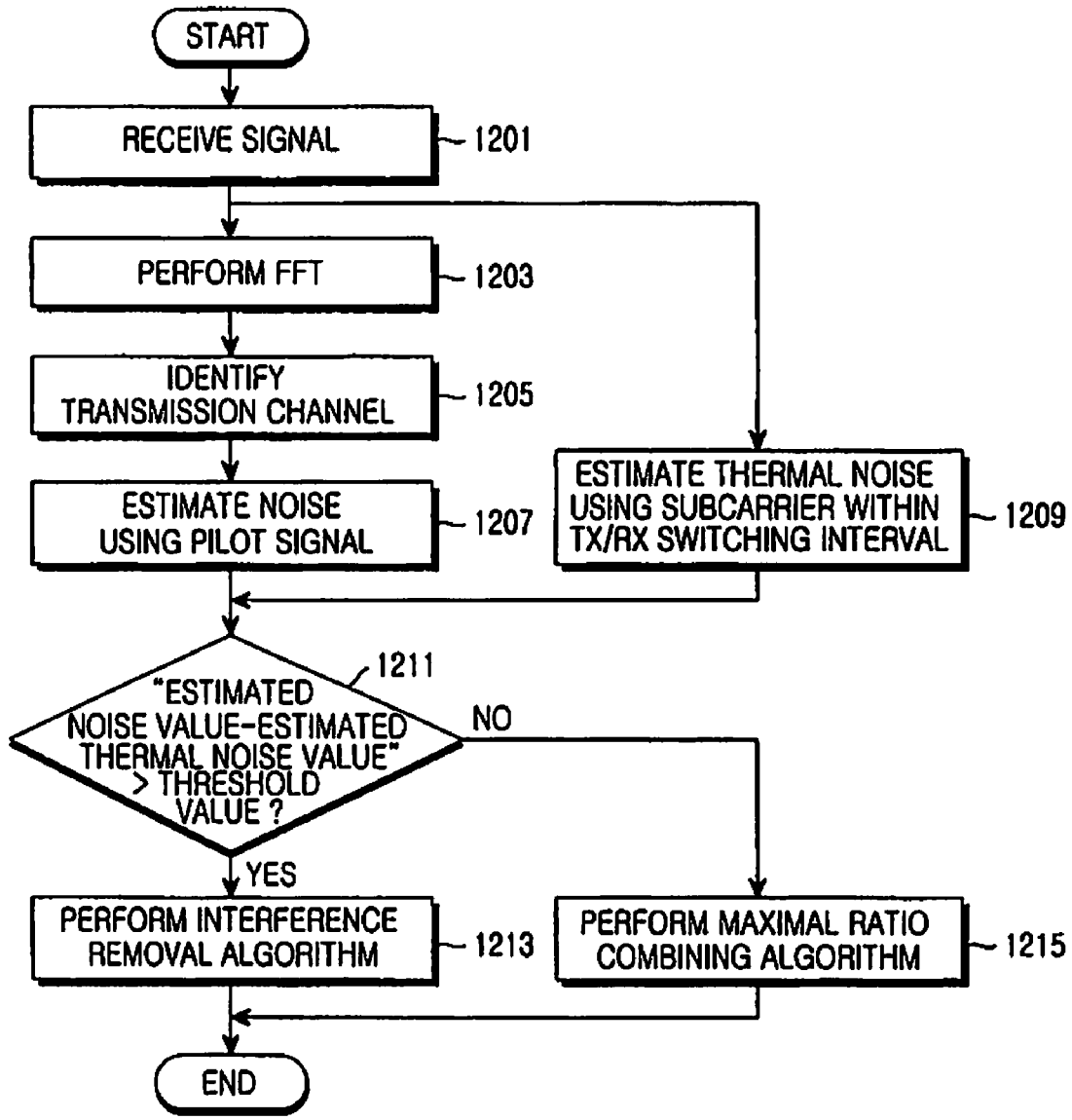
FIG. 12 is a flowchart showing the operation of a receiver in a communication system according to an exemplary embodiment of the present invention.

FIG. 12 is a flowchart showing an example of the operation of a receiver in a communication system according to an exemplary embodiment of the present invention.

The receiver receives a signal in step 1201, and proceeds to steps 1203 and 1209. In step 1203, the receiver generates a frequency-domain signal by performing an FFT operation on the received signal in a time domain, and proceeds to step 1205. In step 1205, the receiver identifies a subscriber station, and proceeds to step 1207. In step 1207, the receiver estimates noise by using a pilot signal, and proceeds to step 1211.

Meanwhile, in step 1209, the receiver estimates thermal noise by using all of or a part of subcarriers existing in the TTG and RTG, and proceeds to step 1211.

In step 1211, the receiver compares a difference between the estimated noise value and the estimated thermal noise value with a threshold value. When it is determined that the difference between the estimated noise value and the estimated thermal noise value is greater than the threshold value, as a result of the comparison, the receiver proceeds to step 1213. In contrast, when it is determined in step 1211 that the difference between the estimated noise value and the estimated thermal noise value is less than or equal to the threshold value, the receiver proceeds to step 1215.

In step 1213, the receiver demodulates the received signal by using the interference removal algorithm, thereby obtaining data. In step 1215, the receiver demodulates the received signal by using the maximal ratio combining algorithm, thereby obtaining data.

Figure 13:
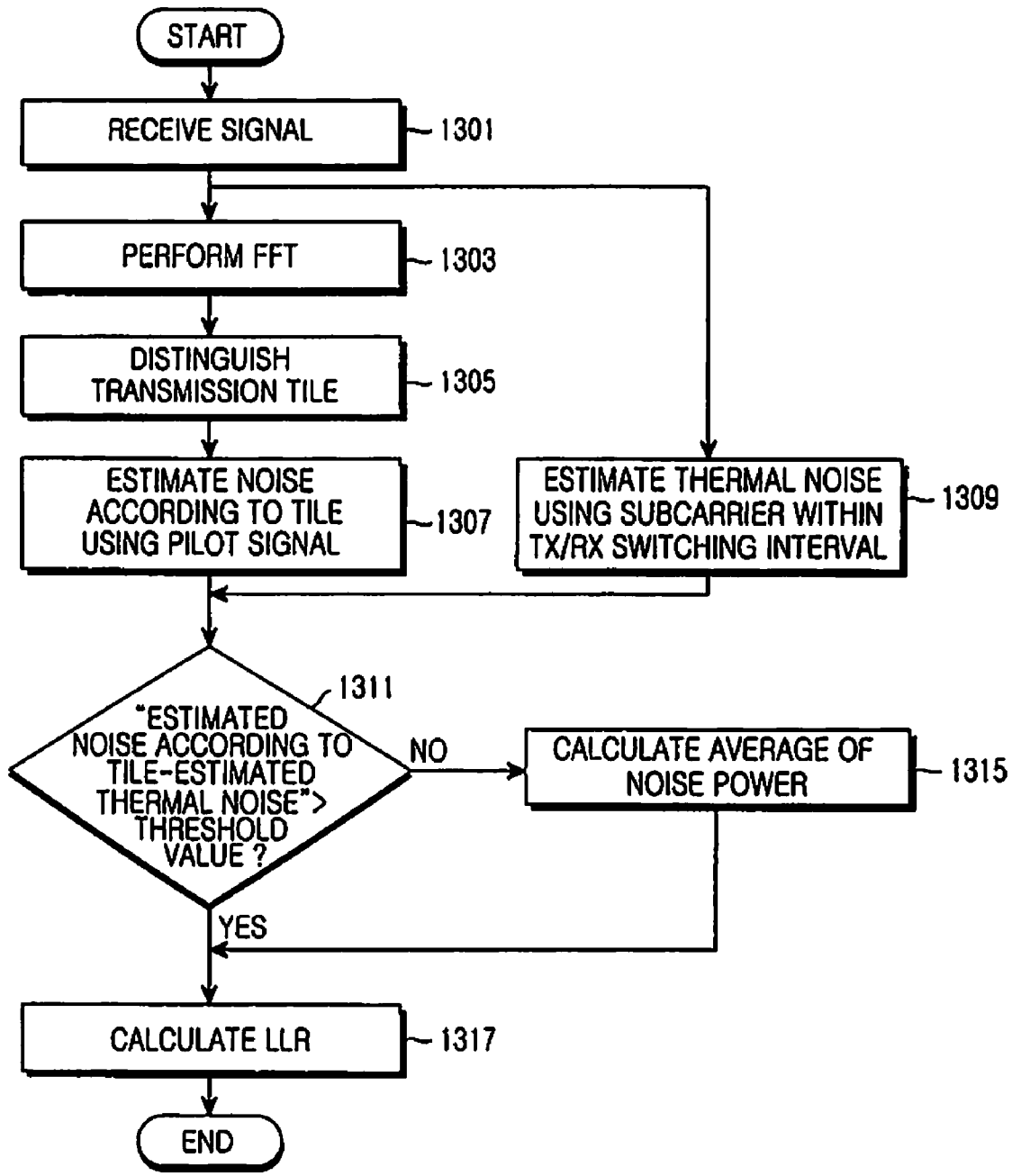
FIG. 13 is a flowchart showing the operation of a receiver in a communication system according to an exemplary embodiment of the present invention.

FIG. 13 is a flowchart showing another example of the operation of a receiver in a communication system according to an exemplary embodiment of the present invention.

The receiver receives a signal in step 1301, and proceeds to steps 1303 and 1309.

In step 1303, the receiver generates a frequency-domain signal by performing an FFT operation on the received signal in a time domain, and proceeds to step 1305. In step 1305, the receiver distinguishes transmission tiles in the received signal, which has been converted into the frequency-domain signal, and proceeds to step 1307. In step 1307, the receiver estimates noise according to each tile, and proceeds to step 1311.

Meanwhile, in step 1309, the receiver estimates thermal noise by using all of or a part of subcarriers existing in a TTG/RTG switching gap, and proceeds to step 1311.

In step 1311, the receiver compares a difference between the noise value estimated according to each tile and the estimated thermal noise value with a threshold value. If it is determined that difference between the noise value estimated according to each tile and the estimated thermal noise value is greater than the threshold value as a result of the comparison, the receiver proceeds to step 1317, and if the estimated noise value is less than or equal to the threshold value, the receiver proceeds to step 1315. In step 1315, the receiver calculates an average of noise, that is, an average of noise powers, from the received signal. Then, the receiver calculates an LLR to be used upon data decoding in step 1317, and decodes the received signal by using the calculated LLR, thereby obtaining data.

As described above, according to the present invention, accurate channel information can be obtained using resources unused upon data transmission. Accordingly, it is possible to improve the data reception performance of the receiver, and to improve the use efficiency of resources by making use of resources unused upon data transmission.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for receiving a signal by a receiver in a communication system, the method comprising the steps of:
   receiving the signal;
   estimating a first noise value by using a reference signal included in the received signal;
   estimating a second noise value by using at least one subcarrier which has been unused for a transmission of data and the reference signal; and
   when a difference between the estimated first noise value and the estimated second noise value is greater than a threshold value, demodulating the received signal by using an interference removal algorithm, thereby obtaining data.

2. The method as claimed in claim 1, wherein the reference signal includes at least one of a preamble and a pilot signal.

3. The method as claimed in claim 1, further comprising when the difference between the estimated first noise value and the estimated second noise value is less than or equal to the threshold value, demodulating the received signal by using a maximal ratio combining algorithm, thereby obtaining data.

4. The method as claimed in claim 1, wherein said at least one subcarrier unused for the transmission of the data and the reference signal includes at least a part of subcarriers which exist in guard intervals between frequency bands.

5. The method as claimed in claim 1, wherein said at least one subcarrier unused for the transmission of the data and reference signal includes at least a part of subcarriers which exist within a transition interval from a downlink subframe to an uplink subframe and within a transition interval from an uplink subframe to a downlink subframe.

6. The method as claimed in claim 1, wherein the second noise value is estimated by:

$$N_0 = \frac{1}{2N_{total}} \sum_{(k,l)}^{N_{total}-1} (|r_k - r_l|^2),$$

wherein "$N_0$" represents an estimated thermal noise power, "$N_{total}$" represents a total number of pairs of subcarriers which exist in a subcarrier interval, "$r_k$" represents a received signal of a $k^{th}$ subcarrier, "$r_l$" represents a received signal of an $l^{th}$ subcarrier, and "(k, l)" represents a pair of adjacent subcarriers.

7. A communication system comprising:
   a base station for transmitting a signal; and
   a subscriber station for, when receiving the signal transmitted from the base station, estimating a first noise value by using a reference signal included in the signal, estimating a second noise value by using at least one subcarrier which has been unused for a transmission of data and the reference signal, and when a difference between the estimated first noise value and the estimated second noise value is greater than a threshold value, demodulating the received signal by using an interference removal algorithm, thereby obtaining data.

8. The system as claimed in claim 7, wherein the reference signal includes a pilot signal.

9. The system as claimed in claim 7, wherein, when the difference between the estimated first noise value and the estimated second noise value is less than or equal to the threshold value, the subscriber station demodulates the received signal by using a maximal ratio combining algorithm, thereby obtaining data.

10. The system as claimed in claim 7, wherein said at least one subcarrier unused for the transmission of the data and reference signal includes a subcarrier which exists in guard intervals between frequency bands.

11. The system as claimed in claim 7, wherein said at least one subcarrier unused for the transmission of the data and the reference signal includes a subcarrier which exists within a transition interval from a downlink subframe to an uplink subframe and/or exists within a transition interval from an uplink subframe to a downlink subframe.

12. The system as claimed in claim 7, wherein the second noise value is estimated by:

$$N_0 = \frac{1}{2N_{total}} \sum_{(k,l)}^{N_{total}-1} (|r_k - r_l|^2),$$

wherein "$N_0$" represents an estimated thermal noise power, "$N_{total}$" represents a total number of pairs of subcarriers which exist in a subcarrier interval, "$r_k$" represents a received signal of a $k^{th}$ subcarrier, "$r_1$" represents a received signal of a $l^{th}$ subcarrier, and "(k, l)" represents a pair of adjacent subcarriers.

13. A method for receiving a signal by a receiver in a communication system, the method comprising the steps of:
receiving the signal;
estimating a first noise value by using a reference signal according to each tile included in the received signal;
estimating a second noise value by using at least one subcarrier which has been unused for a transmission of data and the reference signal; and
when a difference between the estimated first noise value and the estimated second noise value is greater than a threshold value decoding the received signal by using a Log-Likelihood Ratio (LLR), thereby obtaining data.

14. The method as claimed in claim 13, further comprising, when the difference between the estimated first noise value and the estimated second noise value is less than or equal to the threshold value, calculating an average of noise powers estimated according to the tiles.

15. The method as claimed in claim 13, wherein said at least one subcarrier unused for the transmission of the data and reference signal includes at least a part of subcarriers which exist in guard intervals between frequency bands.

16. The method as claimed in claim 13, wherein said at least one subcarrier unused for the transmission of the data and the reference signal includes at least a part of subcarriers which exist within a transition interval from a downlink subframe to an uplink subframe and within a transition interval from an uplink subframe to a downlink subframe.

17. The method as claimed in claim 13, wherein the second noise value is estimated by:

$$N_0 = \frac{1}{2N_{total}} \sum_{(k,l)}^{N_{total}-1} (|r_k - r_l|^2),$$

wherein "$N_0$" represents an estimated thermal noise power, "$N_{total}$" represents a total number of pairs of subcarriers which exist in a subcarrier interval, "$r_k$" represents a received signal of a $k^{th}$ subcarrier, "$r_1$" represents a received signal of a $l^{th}$ subcarrier, and "(k, l)" represents a pair of adjacent subcarriers.

* * * * *